(12) United States Patent
Lin et al.

(10) Patent No.: US 8,314,181 B2
(45) Date of Patent: Nov. 20, 2012

(54) POLYCARBONATE/POLYOLEFIN BASED RESIN COMPOSITIONS AND THEIR PRODUCTION PROCESSES AND USES

(75) Inventors: Ye-Gang Lin, Shanghai (CN); Donghai Sun, Shanghai (CN); David Xiangping Zou, Shanghai (CN)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 13/237,422

(22) Filed: Sep. 20, 2011

(65) Prior Publication Data
US 2012/0010365 A1    Jan. 12, 2012

Related U.S. Application Data

(62) Division of application No. 11/688,440, filed on Mar. 20, 2007.

(51) Int. Cl.
*C08L 69/00* (2006.01)
*C08L 23/26* (2006.01)

(52) U.S. Cl. ............ 525/65; 525/67; 525/108; 525/109; 525/133; 525/146; 525/148

(58) Field of Classification Search .................. None
See application file for complete search history.

(56) References Cited

U.S. PATENT DOCUMENTS

| | | | |
|---|---|---|---|
| 3,635,895 A | 1/1972 | Kramer | |
| 4,001,184 A | 1/1977 | Scott | |
| 4,499,237 A | 2/1985 | Tacke et al. | |
| 4,532,282 A | 7/1985 | Liu et al. | |
| 4,670,508 A | 6/1987 | Ohdaira et al. | |
| 5,187,228 A * | 2/1993 | Perron et al. | 525/66 |
| 5,234,648 A * | 8/1993 | van Es et al. | 264/173.16 |
| 5,349,027 A | 9/1994 | Ueki et al. | |
| 5,594,062 A | 1/1997 | Takemura et al. | |
| 5,623,018 A | 4/1997 | Ohmae et al. | |
| 5,750,620 A | 5/1998 | Davies et al. | |
| 5,847,041 A | 12/1998 | Takemura et al. | |
| 6,469,095 B1 | 10/2002 | Gareiss et al. | |
| 2003/0158336 A1 | 8/2003 | Yaguchi et al. | |

FOREIGN PATENT DOCUMENTS

| | | |
|---|---|---|
| DE | 19653042 A1 | 6/1998 |
| EP | 0308179 A2 | 3/1989 |
| EP | 0947560 A3 | 10/1996 |
| EP | 0911367 A1 | 4/1999 |
| JP | 04296353 A | 10/1992 |

OTHER PUBLICATIONS

IDES ASTM D256 Izod Impact Strength descriptions; no date.
International Search Report for PCT/US2007/073787 International Filing Date Jul. 18, 2007, Mailing Date Nov. 21, 2007 (6 pages).
Written Opinion of the International Searching Authority for PCT/US2007/073787 International Filing Date Jul. 18, 2007, Mailing Date Nov. 26, 2007 (6 pages).

* cited by examiner

*Primary Examiner* — David Buttner
(74) *Attorney, Agent, or Firm* — Cantor Colburn LLP

(57) ABSTRACT

A method of making resin composition having excellent wear properties that includes 50 to 99 wt. % of a polycarbonate resin and from 1 to 50 wt. % of a polyolefin that has been modified with at least one functional group selected from a carboxyl, an acid anhydride, an epoxy groups or mixtures containing at least one of the foregoing functional groups, each based on the total combined weight of the resin composition, exclusive of any filler. The resin composition optionally contains an unmodified polyolefin and/or a bi-functional monomer. The resin composition can be molded into articles having improved wear characteristics. The process is a one-step process that improves the efficiency and/or yield of the resin composition as compared to prior-art two-step processes.

10 Claims, No Drawings

POLYCARBONATE/POLYOLEFIN BASED RESIN COMPOSITIONS AND THEIR PRODUCTION PROCESSES AND USES

CROSS-REFERENCE TO RELATED APPLICATIONS

The present application is a divisional application of U.S. application Ser. No. 11/688,440, filed Mar. 20, 2007, which is incorporated herein by reference in its entirety.

FIELD OF THE INVENTION

The present invention relates to resin compositions, and in particular to thermoplastic polycarbonate/polyolefin compositions having wear-resistant characteristics, methods of manufacturing these resin compositions, and molded articles that include these resin compositions.

BACKGROUND OF THE INVENTION

Polycarbonates are useful in the manufacture of articles and components for a wide range of applications, from automotive parts to electronic appliances. Polycarbonate resins exhibit higher levels of heat resistance, impact resistance, and electric properties as well as good dimensional stability. Polycarbonate resins, however, suffer from high melt viscosity and poor organic solvent resistance as well as poor abrasion/friction properties, and their use in limited in the fields wherein such properties are beneficial.

In order to solve one or more of these problems, various attempts have been attempted wherein the polycarbonate is mixed with a polyolefin. Such resin compositions, however, often fail to be practical due to the low compatibility of the polycarbonate and the polyolefin that often results in delamination, and hence, in poor appearance of the product when a molded article is produced from the resin composition by such means as injection molding. Various attempts have been made to improve the compatibility of the polycarbonate and the polyolefin by incorporating into the polycarbonate-polyolefin resin composition a polystyrene-polyolefin copolymer such as SEBS (styrene-ethylene/butylene-styrene copolymer), SEP (styrene-ethylene/propylene), or the like. However, the incorporated polystyrene-polyolefin copolymer is of elastomeric nature, and the resulting resin composition generally suffers from poor heat resistance and flexural rigidity.

Other prior art solutions have included a polycarbonate-polyolefin resin wherein the polycarbonate has a terminal carboxyl group and a polypropylene having epoxy group or wherein the polycarbonate-polyolefin resin further includes a polycarbonate having a terminal hydroxyl group and polypropylene having carboxyl group. These compositions do not generally undergo delamination, and the articles prepared from such compositions exhibit improved mechanical strength and organic solvent resistance as well as improved outer appearance with no delamination. However, the carboxyl- and the hydroxyl-containing polycarbonates used for constituting such resins are those respectively prepared by adding a special monomer in the polymerization stage of the polycarbonate resin, and production of such resins generally requires a polycarbonate polymerization installation. Therefore, processes utilizing such components result in a heavy financial burden to resin manufacturers that do not have such polycarbonate polymerization installation. Accordingly, production of the polycarbonate-polyolefin resin that includes such a resin component is difficult.

Attempts have also been made to add a fluororesin such as polytetrafluoroethylene to a polycarbonate resin to thereby improve friction/abrasion properties. Such compositions have improved wear resistant properties in addition to the above-described excellent properties inherent to the polycarbonate resin. However, the fluororesin used in such composition is rather expensive, and upon thermal disposal of the resin composition, the fluororesin often generates toxic gases. In view of such situation, there has been a strong demand for a polycarbonate based resin slide material that may substitute for a polycarbonate/fluororesin based resin composition.

An alternative solution has been the use of polyolefin resins, and in particular, high-density polyethylene, low-density polyethylene, and straight-chain low-density polyethylene, that are often inexpensive and/or excellent in friction/abrasion properties. Such polyolefin resins are, however, inferior to the polycarbonate resins in their heat resistance, flexural rigidity, and flame retardancy. Therefore, it has been difficult to use a polyolefin resin in an application wherein a polycarbonate/fluororesin based resin composition is used. In view of such situation, various attempts have been made to mix the polycarbonate with the polyethylene in order to develop a resin composition that is able to maintain the improved heat resistance, impact resistance, and/or flame retardancy of the polycarbonate resin with the improved friction/abrasion properties of the polyolefin. In spite of such attempts, the markedly poor compatibility of the polycarbonate with the polyethylene often results in delamination of the molded article, especially upon frictional contact or under abrasion, leading to poor abrasion properties.

As a result, the process used to form these polycarbonate/polyolefin compositions can suffer from reduced yields. The prior art process is a two-step process wherein an intermediary polyolefin is formed, with the resulting intermediary then mixed with the polycarbonate and extruded to form the resin composition. Since the prior art process for forming the intermediary polyolefin requires a second step using additional equipment and manufacturing time, the prior art two-step process requires additional equipment costs and energy costs to form the resin composition.

Accordingly, it would be beneficial to provide a thermoplastic material that offers enhanced wear characteristics. It would also be beneficial to provide a process for making a resin composition that offered improved yields and/or reduced production costs as compared to prior art processes. It would also be beneficial to provide a molded article made from a resin composition wherein the molded article has improved wear characteristics.

BRIEF SUMMARY OF THE INVENTION

The present invention provides a method of making resin composition having excellent wear properties. The resin composition includes 50 to 99 wt. % of a polycarbonate resin and from 1 to 50 wt. % of a polyolefin that has been modified with at least one functional group selected from a carboxyl, an acid anhydride, an epoxy groups or mixtures containing at least one of the foregoing functional groups, each based on the total combined weight of the resin composition, exclusive of any filler. The resin composition optionally contains an unmodified polyolefin and/or a bi-functional monomer. The process is a one-step process that improves the cost efficiency and/or yield of the resin composition as compared to prior-art two-step processes. The resin composition can be molded into articles having improved wear characteristics.

Accordingly, in one aspect, the present invention provides a method of making a resin composition that includes the steps of blending from 50 to 99 wt. % of a polycarbonate resin and from 1 to 50 wt. % of a polyolefin resin that has been modified with at least one functional group selected from a carboxyl, an acid anhydride, an epoxy groups or mixtures containing at least one of the foregoing functional groups to form a blended mixture and extruding the blended mixture to form the resin composition, wherein the blended mixture is extruded in an extruder having a melt residence time of 20 seconds or greater and wherein the extruder is operated at a temperature from 240° C. to 340° C.

In another aspect the present invention provides a resin composition having enhanced wear characteristics and that includes from 50 to 99 wt. % of a polycarbonate resin and from 1 to 50 wt. % of a polyolefin resin that has been modified with at least one functional group selected from a carboxyl, an acid anhydride, an epoxy groups or mixtures containing at least one of the foregoing functional groups. In yet another aspect, the present invention provides a molded article that includes a resin composition having enhanced wear characteristics.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the term "comprising" may include the embodiments "consisting of" and "consisting essentially of." All ranges disclosed herein are inclusive of the endpoints and are independently combinable. The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value.

The present invention provides a resin composition having enhanced wear characteristics characteristics, methods of making these compositions and articles that include these compositions. The methods of the present invention provide a one-step process for making the resin composition that is more efficient than prior art processes for forming resin compositions.

Accordingly, in one aspect, the present invention provides a method of forming a resin composition. The method provides a one-step process that increases the yield and/or efficiency of prior art two step processes utilized to form prior art polycarbonate/polyolefin resin compositions. The methods of the present invention use a one-step compounding process to produce lubricated polycarbonate compositions having similar properties (mainly wear resistance, delamination behavior and micromorphology), as compared to the current two-step manufacture process. As such, the methods of the present invention are simpler by eliminating one compounding step while also providing for a greater yield in the amount of lubricated polycarbonate composition produced as compared to the amounts of the individual components used. The resin compositions made by the methods of the present invention include polycarbonate, a modified polyolefin and, in alternative embodiments, an unmodified polyolefin and/or a bi-functional monomer.

In prior art two-step processes the modified polyolefin is formed into an intermediary using an extruder. This step of the process results in additional plant equipment and space, as well as time and energy, thereby reducing the efficiency of the process.

On the contrary, the one-step process of the present invention avoids the formation of an intermediary product by admixing the modified polyolefin with the polycarbonate, but provides different formulations and/or sufficient melt residence times to ensure proper compounding of the modified polyolefin with the polycarbonate to form the resin composition. One or more additional components, such as an unmodified polyolefin or a bi-functional monomer, may also be included to help ensure proper compounding of the resin composition and/or to help tailor the final resin composition to have selected physical properties.

Accordingly, in one aspect, the methods of the present invention include the step of extruding the polycarbonate and the modified polyolefin, as well as any additional components, in an extruder for a sufficient period of time and/or at a sufficient temperature to form the resin compositions of the present invention without the need of a step to form an intermediary with the unmodified polyolefin. Accordingly, in one embodiment, the methods of the present invention involve extruding a blend mixture of the polycarbonate and the modified polyolefin, as well as any additional components, wherein the blend mixture has a melt residence time in the extruder of 20 seconds or greater. In another embodiment, the methods of the present invention involve extruding the blend mixture and wherein the blend mixture has a melt residence time in the extruder of 30 seconds or greater. In still another embodiment, the methods of the present invention involve extruding the blend mixture and wherein the blend mixture has a melt residence time in the extruder of 40 seconds or greater.

In addition to the melt residence time in the extruder, the methods of the present invention also help ensure proper compounding of the blend mixture by operating the extruder at a temperature sufficient to form the resin composition. Accordingly, in one embodiment, the extruder is operated at a temperature from 240° C. to 340° C. In another embodiment, the extruder is operated at a temperature from 260° C. to 320° C. In still another embodiment, the extruder is operated at a temperature from 280° C. to 300° C.

In one embodiment, the methods of forming the resin composition form a blend mixture of the components. The blend mixture can, in one embodiment, be formed by blending the components prior to extruding, such as by using a Henschel™ high-speed mixer or by hand mixing. The blend is then fed into the throat of an extruder, such as a twin-screw extruder via a hopper. In an alternative embodiment, a single-screw extruder is used. In another embodiment, an extrusion mixer is used. In still other embodiments, other melt extrusion process equipment may be used. In another alternative embodiment, one or more of the components may be incorporated into the composition by feeding directly into the extruder at the throat and/or downstream through a side stuffer. Any additives may also be compounded into a masterbatch with the selected components and fed into the extruder. The extrudate may be immediately quenched in a water batch and pelletized. The pellets so prepared when cutting the extrudate may be one-fourth inch long or less. Such pellets may be used for subsequent molding, shaping, or forming.

As used herein, the terms "polycarbonate" and "polycarbonate resin" means compositions having repeating structural carbonate units of the formula (1):

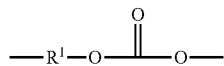

(1)

in which at least 60 percent of the total number of $R^1$ groups are aromatic organic radicals and the balance thereof are aliphatic, alicyclic, or aromatic radicals. Preferably, each $R^1$ is an aromatic organic radical and, more preferably, a radical of the formula (2):

(2)

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ is preferably a hydrocarbon group or a saturated hydrocarbon group such as methylene, cyclohexylidene, or isopropylidene.

Polycarbonates can be produced by the interfacial reaction of dihydroxy compounds having the formula HO—$R^1$—OH, which includes dihydroxy compounds of formula (3)

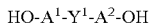

(3)

wherein $Y^1$, $A^1$ and $A^2$ are as described above. Also included are bisphenol compounds of general formula (4):

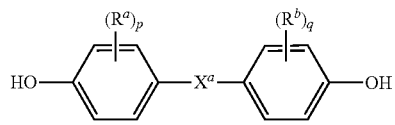

(4)

wherein $R^a$ and $R^b$ each represent a halogen atom or a monovalent hydrocarbon group and may be the same or different; p and q are each independently integers from 0 to 4; and $X^a$ represents one of the groups of formula (5):

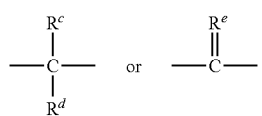

(5)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the dihydroxy-substituted hydrocarbons disclosed by name or formula (generic or specific) in U.S. Pat. No. 4,217,438. A nonexclusive list of specific examples of suitable dihydroxy compounds includes the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl) phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole, 3,3-bis (4-hydroxyphenyl) phthalimidine, 2-phenyl-3,3-bis-(4-hydroxyphenyl) phthalimidine (PPPBP), and the like, as well as mixtures including at least one of the foregoing dihydroxy compounds.

A nonexclusive list of specific examples of the types of bisphenol compounds that may be represented by formula (3) includes 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations including at least one of the foregoing dihydroxy compounds may also be used.

It is also possible to employ two or more different dihydroxy compounds or a copolymer of a dihydroxy compounds with a glycol or with a hydroxy- or acid-terminated polyester or with a dibasic acid or hydroxy acid in the event a carbonate copolymer rather than a homopolymer is desired for use. Polyarylates and polyester-carbonate resins or their blends can also be employed. Branched polycarbonates are also useful, as well as blends of linear polycarbonate and a branched polycarbonate. The branched polycarbonates may be prepared by adding a branching agent during polymerization.

These branching agents are well known, and include polyfunctional organic compounds containing at least three functional groups selected from hydroxyl, carboxyl, carboxylic anhydride, haloformyl, and mixtures thereof. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl) isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents may be added at a level of from 0.05-2.0 weight percent. Branching agents and procedures for making branched polycarbonates are described in U.S. Pat. Nos. 3,635,895 and 4,001,184. All types of polycarbonate end groups are contemplated as being useful in the resin composition.

In certain embodiments, the polycarbonates are based on bisphenol A, in which each of $A^1$ and $A^2$ is p-phenylene and $Y^1$ is isopropylidene. In one embodiment, the average molecular weight of the polycarbonate is 5,000 to 100,000. In another embodiment, the average molecular weight of the polycarbonate is 10,000 to 65,000, and in still another embodiment the average molecular weight of the polycarbonate is 15,000 to 35,000.

In one embodiment, the polycarbonate has flow properties suitable for the manufacture of thin articles. Melt volume flow rate (often abbreviated MVR) measures the rate of extrusion of a thermoplastics through an orifice at a prescribed temperature and load. Polycarbonates suitable for the formation of flame retardant articles may have an MVR, measured at 260° C./2.16 Kg, of from 4 to 30 grams per centimeter cubed ($g/cm^3$). Polycarbonates having an MVR under these conditions of from 12 to 30, specifically from 15 to 30 $g/cm^3$ may be useful for the manufacture of articles having thin walls. Mixtures of polycarbonates of different flow properties can be used to achieve the overall desired flow property.

Methods for the preparation of polycarbonates by interfacial polymerization are well known. Although the reaction conditions of the preparative processes may vary, several of the useful processes typically involve dissolving or dispersing the dihydric phenol reactant in aqueous caustic soda or potash, adding the resulting mixture with the siloxane to a suitable water immiscible solvent medium and contacting the reactants with the carbonate precursor, such as phosgene, in the presence of a suitable catalyst such as triethylamine or a phase transfer catalyst, and under controlled pH conditions, e.g., 8 to 10. The most commonly used water immiscible solvents include, but are not limited to, methylene chloride, 1,2-dichloroethane, chlorobenzene, toluene, and the like.

Among the useful phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-188}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3-[CH_3(CH_2)_3]_3NX$, $CH_3-[CH_3(CH_2)_2]_3NX$ wherein X is $Cl^-$, $Br^-$ or a $C_{1-8}$ alkoxy group or $C_{6-188}$ aryloxy group. An effective amount of a phase transfer catalyst may be from 0.1 to 10 wt. %, and, in another embodiment, from 0.5 to 2 wt. % based on the weight of bisphenol in the phosgenation mixture.

In alternative embodiments, melt processes are used. A catalyst may be used to accelerate the rate of polymerization of the dihydroxy reactant(s) with the carbonate precursor. Representative catalysts include, but are not limited to, tertiary amines such as triethylamine, quaternary phosphonium compounds, quaternary ammonium compounds, and the like.

Alternatively, polycarbonates may be prepared by co-reacting, in a molten state, the dihydroxy reactant(s) and a diaryl carbonate ester, such as diphenyl carbonate, in the presence of a transesterification catalyst in a Banbury™ mixer, twin screw extruder, or other melt extrusion process equipment to form a uniform dispersion. Volatile monohydric phenol is removed from the molten reactants by distillation and the polymer is isolated as a molten residue.

The polycarbonates can be made in a wide variety of batch, semi-batch or continuous reactors. Such reactors are, for example, stirred tank, agitated column, tube, and recirculating loop reactors. Recovery of the polycarbonate can be achieved by any means known in the art such as through the use of an anti-solvent, steam precipitation or a combination of anti-solvent and steam precipitation.

The amount of polycarbonate added to the resin compositions made by the methods of the present invention may be based on the selected properties of the resin compositions as well as molded articles made from these compositions. Other factors include the amount and type of modified polyolefin used, the amount and/or type of unmodified polyolefin used, if any, the amount and/or type of bi-functional monomer used, if any, and/or the amount and presence of other components in the resin compositions. In one embodiment, the polycarbonate is present in amounts of from 50 to 99 wt. %. In another embodiment, the polycarbonate is present in amounts from 55 to 90 wt. %. In still another embodiment, the polycarbonate is present in amounts from 60 to 80 wt. %.

The compositions made by the methods of the present invention further include a polyolefin that has been modified with at least one functional group selected from a carboxyl, an acid anhydride, an epoxy groups or mixtures containing at least one of the foregoing functional groups. The polyolefin resins that may be used in the present invention include crystalline polypropylene, crystalline propylene-ethylene block or random copolymer, low density polyethylene, high density polyethylene, linear low density polyethylene, ultra-high molecular weight polyethylene, ethylene-propylene random copolymer, ethylene-propylene-diene copolymer, and the like. Among such polyolefin resins, exemplary embodiments include crystalline polypropylene, crystalline propylene-ethylene copolymer, low-density polyethylene, high-density polyethylene, linear low-density polyethylene, and ultra-high molecular weight polyethylene.

The polyolefin used in the present invention is modified with at least one functional group selected from a carboxyl, an acid anhydride, an epoxy groups or mixtures containing at least one of the foregoing functional groups. As used herein, a "polyolefin resin modified with at least one functional group selected from a carboxyl, an acid anhydride, an epoxy groups or mixtures containing at least one of the foregoing functional groups" include a polyolefin resin to which an unsaturated monomer containing epoxy, carboxyl, or an acid anhydride group is copolymerized. Exemplary epoxy-containing unsaturated monomers include glycidyl methacrylate, butylglycidyl malate, butylglycidyl fumarate, propylglycidyl malate, glycidyl acrylate, N-[4-(2,3-epoxypropoxy)-3,5-dimethylbenzyl]-acrylamide, and the like. Among these, beneficial embodiments include glycidyl methacrylate and N-[4-(2,3-epoxypropoxy)-3,5-dimethylbenzyl]acrylamide. Exemplary carboxyl-containing unsaturated monomers include acrylic acid, methacrylic acid, maleic acid, and the like. Exemplary unsaturated monomers containing an acid anhydride group are maleic anhydride, itaconic anhydride, citraconic anhydride, and the like. Beneficial embodiments include acrylic acid and maleic anhydride.

The unsaturated monomer containing epoxy, carboxyl, or an acid anhydride group may be copolymerized with the polyolefin resin by any known process. Exemplary processes include melt kneading of the polyolefin resin and the unsaturated monomer in a twin screw extruder, a Banbury mixer, a kneader or other melt extrusion process equipment in the presence or absence of a radical initiator, and copolymerization by the copresence of the monomer constituting the polyolefin with the unsaturated monomer containing epoxy, carboxyl, or acid anhydride. The content of the unsaturated monomer is, in one embodiment in the range of from 0.01 to 10% by weight, and in an alternative embodiment, from 0.1 to 5% by weight of the modified polyolefin resin.

The resin composition made by the methods of the present invention may contain the modified polyolefin resin in one embodiment in an amount of from 50 to 1% by weight. In another embodiment, the resin composition may include from 45 to 5% by weight of the modified polyolefin. In still another embodiment, the resin composition may include from 40 to 20% by weight. Since larger amounts of the polyolefin resin may result in a resin composition having reduced heat resistance, it may be beneficial in select embodiments that the melt index of the modified polyolefin resin not be limited to any particular range. However, the modified polyolefin resin may have, in one embodiment, a melt index (at 230° C., under a load of 2.16 kg) of from 0.1 to 70 g/10 min, and in another embodiment, from 0.5 to 30 g/10 min.

In alternative embodiments, the resin compositions made by the methods of the present invention include an unmodified polyolefin in addition to the polycarbonate and the modified polyolefin. The unmodified polyolefin may be the same base polyolefin that is used in the modified polyolefin, or it may be a different polyolefin. Alternatively, the unmodified polyolefin may include a mixture of two or more polyolefins. The unmodified polyolefin resins that may be used in the present invention include crystalline polypropylene, crystalline propylene-ethylene block or random copolymer, low density polyethylene, high density polyethylene, linear low density polyethylene, ultra-high molecular weight polyethylene, ethylene-propylene random copolymer, ethylene-propylene-diene copolymer, and the like.

In those embodiments wherein an unmodified polyolefin is included, the unmodified polyolefin is, in one embodiment, included in an amount from 0.1 to 15 wt. %. In another embodiment, the unmodified polyolefin is included in an amount from 1 to 10 wt. %. In still another embodiment, the unmodified polyolefin is included in an amount from 1 to 6 wt. %.

In still other alternative embodiments, the resin compositions of the present invention include a bi-functional monomer represented by the Formula (6), (7) or (8).

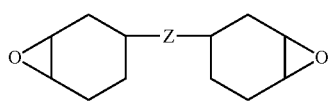 (6)

wherein Z is an alkylene group, an alkylidene, an oligomethylene group, a phenylene group, or a naphthylene group containing at least 5 carbon atoms, the phenylene group and the naphthylene group being optionally substituted with a substituent.

HO—R—OH (7)

wherein R is an alkylene group, an alkylidene, an oligomethylene group, a phenylene group, or a naphthylene group containing at least 5 carbon atoms, the phenylene group and the naphthylene group being optionally substituted with a substituent.

HOOC—R—COOH (8)

wherein R is an alkylene group, an alkylidene, an oligomethylene group, a phenylene group, or a naphthylene group containing at least 5 carbon atoms, the phenylene group and the naphthylene group being optionally substituted with a substituent.

The bi-functional monomer may be used in embodiments with or without the unmodified polyolefin. In addition, the bi-functional monomer may include a mixture of two or more bi-functional monomers represented by Formula (6), Formula (7), or both Formula (6) and Formula (7). In those embodiments wherein a bi-functional monomer is included, the bi-functional monomer is, in one embodiment, included in an amount from 0.1 to 5 wt. %. In another embodiment, the bi-functional monomer is included in an amount from 0.5 to 5 wt. %. In still another embodiment, the bi-functional monomer is included in an amount from 0.5 to 2.5 wt. %.

In addition to the foregoing components, the resin compositions of the present invention may include various additives ordinarily incorporated in resin compositions of this type. Mixtures of additives may be used. Such additives may be mixed at a suitable time during the mixing of the components for forming the composition. Examples of such additives include, but are not limited to, fillers and/or reinforcing agents, heat stabilizers, antioxidants, light stabilizers, antistatic agents, plasticizers, mold release agents, UV absorbers, lubricants, pigments, dyes, colorants, blowing agents, or a mixture including at least one of the foregoing additives.

Suitable fillers or reinforcing agents include, for example, TiO$_2$; fibers, such as asbestos, carbon fibers, or the like; silicates and silica powders, such as aluminum silicate (mullite), synthetic calcium silicate, zirconium silicate, fused silica, crystalline silica graphite, natural silica sand, or the like; boron powders such as boron-nitride powder, boron-silicate powders, or the like; alumina; magnesium oxide (magnesia); calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin including various coatings known in the art to facilitate compatibility with the polymeric matrix resin, or the like; single crystal fibers or "whiskers" such as silicon carbide, alumina, boron carbide, iron, nickel, copper, or the like; glass fibers, (including continuous and chopped fibers), such as E, A, C, ECR, R, S, D, and NE glasses and quartz, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends including at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations including at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of from 1 to 50 parts by weight, based on 100 parts by weight of the total composition.

Suitable heat stabilizers include, for example, organo phosphites such as triphenyl phosphite, tris-(2,6-dimethylphenyl)phosphite, tris-(mixed mono- and di-nonylphenyl) phosphite or the like; phosphonates such as dimethylbenzene phosphonate or the like, phosphates such as trimethyl phosphate, or the like, or combinations including at least one of the foregoing heat stabilizers. Heat stabilizers are generally used in amounts of from 0.01 to 0.5 parts by weight based on 100 parts by weight of the total composition, excluding any filler.

Suitable antioxidants include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of paracresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations including at least one of the foregoing antioxidants. Antioxidants are generally used in amounts of from 0.01 to 0.5 parts by weight, based on 100 parts by weight of the total composition, excluding any filler.

Suitable light stabilizers include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers are generally used in amounts of from 0.1 to 1.0 parts by weight, based on 100 parts by weight of the total composition, excluding any filler.

Suitable plasticizers include, for example, phthalic acid esters such as dioctyl-4,5-epoxy-hexahydrophthalate, tris-(octoxycarbonylethyl)isocyanurate, tristearin, epoxidized soybean oil or the like, or combinations including at least one of the foregoing plasticizers. Plasticizers are generally used in amounts of from 0.5 to 3.0 parts by weight, based on 100 parts by weight of the total composition, excluding any filler.

Suitable antistatic agents include, for example, glycerol monostearate, sodium stearyl sulfonate, sodium dodecylbenzenesulfonate or the like, or combinations of the foregoing antistatic agents. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents are generally used in amounts of from 0.1 to 3.0 parts by weight based on 100 parts by weight the total composition, excluding any filler.

Suitable mold releasing agents include for example, stearyl stearate, pentaerythritol tetrastearate, beeswax, montan wax, paraffin wax, or the like, or combinations including at least one of the foregoing mold release agents. Mold releasing agents are generally used in amounts of from 0.1 to 1.0 parts by weight, based on 100 parts by weight of the total composition, excluding any filler.

Suitable UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1, 3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl) oxy]-2,2-bis[[(2-cyano-3,3-diphenylacryloyl) oxy]methyl] propane (UVINUL™ 3030); 2,2'-(1,4-phenylene) bis(4H-3, 1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight based on 100 parts by weight of the total composition, excluding any filler.

Suitable lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from 0.1 to 5 parts by weight, based on 100 parts by weight of the total composition, excluding any filler.

Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates; sulfates and chromates; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations including at least one of the foregoing pigments. Pigments are generally used in amounts of from 1 to 10 parts by weight, based on 100 parts by weight based on 100 parts by weight of the total composition, excluding any filler.

Suitable dyes include, for example, organic dyes such as coumarin 460 (blue), coumarin 6 (green), nile red or the like; lanthanide complexes; hydrocarbon and substituted hydrocarbon dyes; polycyclic aromatic hydrocarbons; scintillation dyes (preferably oxazoles and oxadiazoles); aryl- or heteroaryl-substituted poly(2-8 olefins); carbocyanine dyes; phthalocyanine dyes and pigments; oxazine dyes; carbostyryl dyes; porphyrin dyes; acridine dyes; anthraquinone dyes; arylmethane dyes; azo dyes; diazonium dyes; nitro dyes; quinone imine dyes; tetrazolium dyes; thiazole dyes; perylene dyes, perinone dyes; bis-benzoxazolylthiophene (BBOT); and xanthene dyes; fluorophores such as anti-stokes shift dyes which absorb in the near infrared wavelength and emit in the visible wavelength, or the like; luminescent dyes such as 5-amino-9-diethyliminobenzo(a)phenoxazonium perchlorate; 7-amino-4-methylcarbostyryl; 7-amino-4-methylcoumarin; 3-(2'-benzimidazolyl)-7-N,N-diethylaminocoumarin; 3-(2'-benzothiazolyl)-7-diethylaminocoumarin; 2-(4-biphenylyl)-5-(4-t-butylphenyl)-1,3,4-oxadiazole; 2-(4-biphenyl)-6-phenylbenzoxazole-1,3; 2,5-Bis-(4-biphenylyl)-1,3,4-oxadiazole; 2,5-bis-(4-biphenylyl)-oxazole; 4,4'-bis-(2-butyloctyloxy)-p-quaterphenyl; p-bis(o-methylstyryl)-benzene; 5,9-diaminobenzo(a) phenoxazonium perchlorate; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-diethylamino-4-methylcoumarin; 7-diethylamino-4-trifluoromethylcoumarin; 2,2'-dimethyl-p-quaterphenyl; 2,2-dimethyl-p-terphenyl; 7-ethylamino-6-methyl-4-trifluoromethylcoumarin; 7-ethylamino-4-trifluoromethylcoumarin; nile red; rhodamine 700; oxazine 750; rhodamine 800; IR 125; IR 144; IR 140; IR 132; IR 26; IR5; diphenylhexatriene; diphenylbutadiene; tetraphenylbutadiene; naphthalene; anthracene; 9,10-diphenylanthracene; pyrene; chrysene; rubrene; coronene; phenanthrene or the like, or combinations including at least one of the foregoing dyes. Dyes are generally used in amounts of from 0.1 to 5 parts by weight, based on 100 parts by weight of the total composition, excluding any filler.

Suitable colorants include, for example titanium dioxide, anthraquinones, perylenes, perinones, indanthrones, quinacridones, xanthenes, oxazines, oxazolines, thioxanthenes, indigoids, thioindigoids, naphthalimides, cyanines, xanthenes, methines, lactones, coumarins, bis-benzoxazolylthiophene (BBOT), napthalenetetracarboxylic derivatives, monoazo and disazo pigments, triarylmethanes, aminoketones, bis(styryl)biphenyl derivatives, and the like, as well as combinations including at least one of the foregoing colorants. Colorants are generally used in amounts of from 0.1 to 5 parts by weight, based on 100 parts by weight of the total composition, excluding any filler.

Suitable blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4'oxybis(benzenesulfonylhydrazide), sodium bicarbonate, ammonium carbonate, or the like, or combinations including at least one of the foregoing blowing agents. Blowing agents are generally used in amounts of from 1 to 20 parts by weight, based on 100 parts by weight of the total composition, excluding any filler.

Additionally, materials to improve flow and other properties may be added to the composition, such as low molecular weight hydrocarbon resins. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated.

Examples of commercially suitable low molecular weight hydrocarbon resins derived from petroleum $C_5$ to $C_9$ feedstock include the following: hydrocarbon resins available from Eastman Chemical under the trademark Piccotac®, the aromatic hydrocarbon resins available from Eastman Chemical under the trademark Picco®, the fully hydrogenated alicyclic hydrocarbon resin based on $C_9$ monomers available from Arakawa Chemical Inc. under the trademark ARKON® and sold, depending on softening point, as ARKON® P140, P125, P115, P100, P90, P70 or the partially hydrogenated hydrocarbon resins sold as ARKON® M135, M115, M100 and M90, the fully or partially hydrogenated hydrocarbon resin available from Eastman Chemical under the tradename REGALITE® and sold, depending on softening point, as REGALITE® R1100, S1100, R1125, R1090 and R1010, or the partially hydrogenated resins sold as REGALITE® R7100, R9100, S5100 and 57125, the hydrocarbon resins available from Exxon Chemical under the trade ESCOREZ®, sold as the ESCOREZ® 1000, 2000 and 5000 series, based on C5, C9 feedstock and mixes thereof, or the hydrocarbon resins sold as the ESCOREZ® 5300, 5400 and 5600 series based on cyclic and C9 monomers, optionally hydrogenated and the pure aromatic monomer hydrocarbon resins such as for instance the styrene, α-methyl styrene based hydrocarbon resins available from Eastman Chemical under the tradename Kristalex®. Low molecular weight hydrocarbon resins are generally used in amounts of from 0.1 to 10 parts by weight, based on 100 parts by weight of the total composition, excluding any filler.

The resin compositions may further have a heat deflection temperature (HDT) from 90 to 135° C., specifically from 100 to 125° C., measured according to ASTM D-648 at 1.8 MPa using 6.35 mm thick testing bar.

The resin compositions may further have a Notched Izod Impact (NII) of from 500 J/m to 900 J/m, measured at room temperature using 3.18 mm (+3%) bars in accordance with ASTM D256 or ASTM D4812.

The resin compositions may further have tensile properties, such as Tensile Strength of from 1500 to 2300 MPa. Tensile Strength was determined using Type I 3.2 mm thick molded tensile bars tested per ASTM D 638 standard 3.2 mm thick molded tensile bars at a pull rate of 5 mm/min, followed by a rate of 50 mm/min. until the sample broke. It is also possible to measure at 5 mm/min if desired for the specific application, but the samples measured in these experiments were measured at 50 mm/min Tensile Strength and Tensile Modulus results are reported as MPa.

Shaped, formed, or molded articles including the resin compositions are also provided. The resin compositions can be molded into useful shaped articles by a variety of means such as injection molding, extrusion, rotational molding, blow molding and thermoforming to form articles. The above-described compositions are of particular utility in the manufacture of articles including a minimum wall thickness of as low as 0.1 mm, 0.5 mm, 1.0 mm, or 2.0 mm (each ±10%). The above-described compositions are also of particular utility in the manufacture of articles including a minimum wall thickness of 2.25 to 2.90 mm (each ±10%), in an alternative embodiment 2.4 to 2.75 mm (each ±10%), and in another embodiment, 2.40 to 2.60 mm (each ±10%). Minimum wall thicknesses of 2.25 to 2.50 mm (each ±10%) may also be manufactured.

The compositions of the present invention are especially useful in applications wherein enhanced wear characteristics are beneficial. Examples of such applications include, but are not limited to, gears, casters, bushings, door hinges keyboard gear trains, Auto Leaf spacers, chassis, door lock mechanisms, snake lights, push/pull cables, paper paths, HDD storage components, soft metal wear, drapery hardware, window slides, wiper assemblies, door catches, seat switches, brake components, automotive gears, steering assemblies, lawn components, docking station levers, latches, and the like.

The present invention is further illustrated by the following non-limiting examples.

EXAMPLES

A first set of experiments was performed to that the methods of the present invention are capable of forming lubricated polycarbonate using a one-step compounding process that have similar properties as compared to the current two-step manufacture process, thus simplifying the process by eliminating one compounding step.

The samples were made by blending the components together and feeding the mixture into a twin-screw extruder having a screw configuration with melt residential time>20 seconds. The materials were then compounded in the twin-screw extruder and formed into pellets. The pellets were then formed into thrush washers for testing in the Thrush Washer Wear Test. The types and amounts of each component are set forth in Table 1. Table 2 provides the amounts and process for forming the comparative example made using a conventional two-step process.

TABLE 1

| | Component | | | | |
|---|---|---|---|---|---|
| | | B1 | B2 | C | D |
| Examples | A (wt %) | (wt %) | (wt %) | (wt %) | e (wt %) | f (wt %) |
| 1 | PC, 100 | | | | | |
| 2 | PC, 94 | | | 6 | | |
| 3 | PC, 93 | | | 6 | 1 | |
| 4 | PC, 94 | 6 | | | | |
| 5 | PC, 96.5 | 3 | | | 0.5 | |
| 6 | PC, 96 | 3 | | | 1 | |
| 7 | PC, 95.5 | 3 | | | 1.5 | |
| 8 | PC, 93.7 | 6 | | | 0.3 | |
| 9 | PC, 93.2 | 6 | | | 0.8 | |
| 10 | PC, 93 | 6 | | | 1 | |
| 11 | PC, 92 | 6 | | | 2 | |
| 12 | PC, 87.5 | 11.5 | | | 1 | |
| 13 | PC, 88 | 11.5 | | | 0.5 | |
| 14 | PC, 87 | 11.5 | | | 1.5 | |
| 15 | PC, 79.5 | 20 | | | 0.5 | |

TABLE 1-continued

| | Component | | | | |
|---|---|---|---|---|---|
| | | B1 | B2 | C | D |
| Examples | A (wt %) | (wt %) | (wt %) | (wt %) | e (wt %) | f (wt %) |
| 16 | PC, 78.5 | 20 | | | 1.5 | |
| 17 | PC, 93.5 | 3 | | 3 | 0.5 | |
| 18 | PC, 94 | | 6 | | | |
| 19 | PC, 93 | | 6 | 1 | | |
| 20 | PC, 94 | | 3 | 3 | | |
| 21 | PC, 95 | | 1 | 4 | | |
| 22 | PC, 93.7 | | 6 | | | 0.3 |
| 23 | PC, 93.75 | | 6 | | | 1.25 |
| 24 | PC, 93.7 | | 3 | 3 | | 0.1 |
| 25 | PC, 93.7 | | 3 | 3 | | 0.3 |
| 26 | PC, 94.5 | | 2 | 1 | | 2.5 |
| 27 | PC, 92.8 | | 2 | 4 | | 1.2 |

Notes:
B1 is Maleic anhydride grafted PE
B2 is epoxy group containing PE
C is LLDPE
e is 3,4-epoxy cyclohexylmethyl-3,4-epoxy cyclohexyl carboxylate
f is phenolphthalein

TABLE 2

| Description | EXAMPLE 28 |
|---|---|
| Step 1 process: using twin screw extruder to get intermediate concentrate | |
| B1    MAH grafted PE | 97.00 |
| G     Amino acid | 3.00 |
| Step 2: using twin screw extruder to get the products | |
| H     intermediate concentrate | 6 |
| A     Polycarbonate 1 | 94 |

The wear of the sample materials was tested using a Thrush Washer Wear Test. This wear test method was used to determine the wear factor (K) of plastic materials is similar to that the wear test described in ASTM D3702-78. In this test, the plastic material is injection molded to the specimens that are circular in shape, have a bore in the middle of the washer, and have a raised outer edge. The wear area (A) was calculated by equation (1) wherein:

$$A = \{B[(O.D./2)5 - (I.D./2)5]\} \text{ in}^2 \qquad \text{Eq. (1)}$$

wherein Do=the outer diameter of the wear washer=1.125", and Di=the inner diameter of the wear washer=0.904"

The specimens were conditioned according to WI-0618 (ASTM). The standard test was conducted by rotating a plastic thrust washer, at a 50 ft./min. speed and under a 40 lbs./in$^2$ pressure, against a steel wear ring counterface which was held stationary. The applied pressure (psi) and speed (fpm) condition, when multiplied together, was known as the PV (pressure-velocity) value for the test and is set forth in equation (2):

$$PV = (pressure)(speed) \qquad \text{Eq. (2)}$$

In these examples, PV=(40 lbs./in$^2$)(50 ft./min)=2000 PV. The test was conducted by running the thrust washer test specimen approximately 72 hours under 2000PV in a laboratory atmosphere of 23±2° C. and 50±5% relative humidity. Then the specimen was removed and weight loss was measured. From this weight loss value a wear factor (K) could be calculated using equation (3):

$$\text{Wear } (K) \text{ Factor} = [(6.1 \times 10-5)(\text{wt. loss})]/[(PV)(\text{density})(\text{time})] \qquad \text{Eq. (3)}$$

Additionally, static and dynamic coefficients of friction are measured using equation 4:

Coefficient of Friction=(10.5)(force)/(area)(pressure)   Eq. (4)

The results of the wear test are set forth in Table 3.

TABLE 3

| | MFR (g/10 min) | Deflection Temperature (deg C.) | Flexural Modulus (MPa) | Izod impact strength (J/M) | Wear factor K | Coefficient of friction | Wear Temperature (F.) | Delamination rating |
|---|---|---|---|---|---|---|---|---|
| Examples | | | | | | | | |
| 1 | 10 | 121 | 2220 | 764 | 2500 | 0.19 | \\ | \\ |
| 2 | 10.9 | 123 | 2050 | 799 | 83.8 | 0.238 | 115.7 | 4 |
| 3 | 9.13 | 120 | 2130 | 810 | \\ | \\ | \\ | 4 |
| 4 | 9.57 | 125 | 1860 | 800 | 101 | 0.223 | 113.6 | 3 |
| 5 | 11 | 122 | 2050 | 803 | 14.23 | 0.298 | 133.3 | 1 |
| 6 | 12 | 122 | 2090 | 791 | 17.33 | 0.333 | 114.6 | 1 |
| 7 | 13.4 | 117 | 2200 | 828 | 36.86 | 0.235 | 114.1 | 1 |
| 8 | 8.18 | 123 | 2090 | 838 | 2.59 | 0.368 | 121.8 | 3 |
| 9 | 12 | 121 | 1980 | 723 | 12.68 | 0.361 | 135.8 | 2 |
| 10 | 11.2 | 119 | 2110 | 799 | 21.2 | 0.291 | 75.3 | 2 |
| 11 | 7.76 | 116 | 2160 | 872 | 10.03 | 0.402 | 117.7 | 2 |
| 12 | 10.6 | 119 | 1850 | 641 | 19.08 | 0.276 | 109.8 | 3 |
| 13 | 7.02 | 121 | 1770 | 633 | 22.42 | 0.277 | 116.4 | 3 |
| 14 | 8.74 | 115 | 1860 | 637 | 3.43 | 0.274 | 110.4 | 3 |
| 15 | 4.29 | 118 | 1580 | 581 | 16.07 | 0.255 | 107.4 | 4 |
| 16 | 2.16 | 111 | 1620 | 530 | 10.56 | 0.227 | 104 | 4 |
| 17 | 9.99 | 121 | 2130 | 824 | −1.56 | 0.385 | 140.2 | 4 |
| 18 | 6.29 | 123 | 1830 | 792 | 1140 | 0.287 | 115.5 | 1 |
| 19 | 5.06 | 125 | 2030 | 814 | 27.46 | 0.356 | 137.1 | 1 |
| 20 | 6.3 | 124 | 1820 | 800 | 17.8 | 0.373 | 134.8 | 1 |
| 21 | 6.57 | 125 | 1860 | 811 | 3.4 | 0.390 | 137.5 | 4 |
| 22 | 6.58 | 123 | 1820 | 763 | \\ | \\ | \\ | 1 |
| 23 | 25.4 | 122 | 2020 | 635 | 1385 | 0.412 | 122.8 | 1 |
| 24 | 4.91 | 124 | 1820 | 805 | 10.27 | 0.355 | 132.9 | 1 |
| 25 | 7.95 | 124 | 2040 | 774 | 5.21 | 0.32 | 130.3 | 1 |
| 26 | 28.8 | 120 | 2190 | 623 | 974 | 0.179 | 94.5 | 1 |
| 27 | 11.3 | 120 | 2100 | 740 | \\ | \\ | \\ | 3 |
| Comparative example | | | | | | | | |
| 28 | 11 | 133.1 | 2032 | 790 | 60 | 0.393 | \\ | 2 |

As may be seen, the example 1 is pure polycarbonate as a reference example. Example 2 is a blend of PC and unmodified PE. The large domain size and clear phase boundary illustrated the poor capability of PC and PE that results in a poor delamination behavior (rating: 4). The lower the delamination rating, the better the delamination property. A delamination rating of 1 or 2 is considered to be acceptable.

In Example 3, component (e) was added in the blend. There was no function group in PE and no reaction occurred between the PC and PE. Severe phase separation was shown by the large domain size and clear phase boundary. Example 4 was a blend of PC and PE/MAH. Though the delamination rating (3) was better than examples 2 and 3, obvious phase separation was still observed.

Examples 5, 6, and 7 showed the lowest PE loading studied in these examples. Using 3% PE/MAH and a range from 0.5 to 1.5%, all properties are acceptable.

Examples 8-17 illustrate various amounts of the components. While the mechanical properties were often acceptable, as may be seed from the results, delamination sometimes occurred. Therefore, while these samples provide some useful embodiments, the beneficial aspects of good wear and mechanical properties were not always achieved.

Example 18 was a blend of PC and PE/epoxy (component B2). The small domain size illustrate the good compatibility of PC and PE/epoxy and the good delamination behavior (rating: 1). However, the high wear factor K (1140) means the wear resistance of this sample is bad. This sample showed the beneficial aspects of adjusting the phase separation to get good wear resistance.

Examples 19, 20, and 21 used unmodified PE and PE/epoxy in these samples. Example 19 shows that 1% unmodified PE significantly enhanced the wear resistance of example 18. The morphology of example 20 is identical with our benchmark example 28. The wear resistance was very good. The delamination rating 1 shows better delamination behavior than example 28. However, when the ratio of unmodified PE to PE/epoxy reaches ¼, negative delamination behavior started to occur.

In Examples 22 and 23, these two samples were blends of polycarbonate, PE/epoxy and component (f). The existence of (f) improved the compatibility of PC and PE/epoxy that was illustrated by the smaller domain size than without (f). In Examples 24-27 hybrid lubricants were used in these samples. A comparison of Examples 24 and 25 shows that component (f) can improve the flexural modulus of the samples. Lastly, Example 28 is the sample produced by a prior art two-step compounding process. It was taken as a benchmark of the technology described in these Examples.

As set forth herein, compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs. Where a measurement is followed by the notation "(±10%)" or "(±3%)", the measurement may vary within the indicated percentage either positively or negatively. This variance may be manifested in the sample as a whole (e.g., a sample that has a uniform width that is within the indicated percentage of the stated value), or by variation(s) within the sample (e.g., a sample having a variable width, all such variations being within the indicated percentage of the stated value).

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A method of forming a resin composition, comprising the steps of:

blending 50 to 99 wt. % of a polycarbonate resin with 1 to 50 wt. % of a polyolefin that has been modified with at least one functional group selected from a carboxyl, an acid anhydride, an epoxy groups or mixtures containing at least one of the foregoing functional groups to form a blended mixture;

wherein the blended mixture further comprises an unmodified polyolefin selected from crystalline polypropylene, crystalline propylene-ethylene block or random copolymer, low density polyethylene, high density polyethylene, linear low density polyethylene, ultra-high molecular weight polyethylene, ethylene-propylene random copolymer, ethylene-propylene-diene copolymer, or a mixture comprising at least one of the foregoing polyolefins and a bi-functional monomer wherein the bi-functional monomer comprises a monomer represented formula (6):

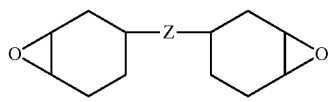 (6)

wherein Z is an alkylene group, an alkylidene, an oligomethylene group, a phenylene group, or a naphthylene group containing at least 5 carbon atoms, the phenylene group and the naphthylene group being optionally substituted with a substituent, a monomer represented formula (7):

HO—R—OH (7)

wherein R is an alkylene group, an alkylidene, an oligomethylene group, a phenylene group, or a naphthylene group containing at least 5 carbon atoms, the phenylene group and the naphthylene group being optionally substituted with a substituent;

a monomer represented formula (8):

HOOC—R—COOH (8)

wherein R is an alkylene group, an alkylidene, an oligomethylene group, a phenylene group, or a naphthylene group containing at least 5 carbon atoms, the phenylene group and the naphthylene group being optionally substituted with a substituent, or combinations of one or more of the foregoing; and extruding the blended mixture to form the resin composition;

wherein the blended mixture is extruded in an extruder having a melt residence time of 20 seconds or greater and wherein the extruder is operated at a temperature of 240° C. to 340° C.; and wherein the resin composition has a Notched Izod Impact of 500J/m to 900J/m as measured at room temperature using 3.18 mm (+3%) bars in accordance with a standard selected from ASTM D256.

2. The method of claim 1, wherein the extruder is selected from a single-screw extruder, a twin-screw extruder, or an extrusion mixer.

3. The method of claim 1, wherein the resin composition comprises 70 to 99 wt. % polycarbonate and 30 to 1 wt. % modified polyolefin.

4. The method of claim 3, wherein the resin composition comprises 80 to 97 wt. % polycarbonate and 3 to 20 wt. % modified polyolefin.

5. The method of claim 1, wherein the blended mixture further comprises 0.1 to 15 wt. % of the unmodified polyolefin.

6. The method of claim 1, wherein bi-functional monomer is present in an amount of 0.1 to 5 wt. %.

7. The method of claim 1, wherein the blended mixture is extruded in an extruder having a melt residence time of 30 seconds or greater.

8. The method of claim 1, wherein the Notched Izod Impact is 800 J/m to 900 J/m.

9. The method of claim 1, wherein an injected molded part formed from the resin composition has a wear factor K of less than or equal to 36.86, as calculated according to equation (3)

Wear ($K$) Factor=[(6.1×10−5)(wt. loss)]/[(PV)(density)(time)]　　　Eq.(3).

10. The method of claim 1, wherein the resin composition has a weight ratio of unmodified PE to PE/epoxy of greater than ¼.

* * * * *